(12) United States Patent
Carrico (10) Patent No.: US 8,681,021 B1
(45) Date of Patent: Mar. 25, 2014

(54) SYSTEM, APPARATUS, AND METHOD FOR GENERATING A LATERAL METEOROLOGICAL PROFILE ON AN AIRCRAFT DISPLAY UNIT

(75) Inventor: Matthew J. Carrico, Mt. Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 354 days.

(21) Appl. No.: 13/248,357

(22) Filed: Sep. 29, 2011

(51) Int. Cl.
*G08B 23/00* (2006.01)

(52) U.S. Cl.
USPC .......................................................... 340/970

(58) Field of Classification Search
USPC .............. 340/970, 977, 980, 945, 971; 701/4; 342/26 R
See application file for complete search history.

(56) References Cited

U.S. PATENT DOCUMENTS

| | | | |
|---|---|---|---|
| 5,202,690 A * | 4/1993 | Frederick | 342/26 B |
| 5,398,033 A * | 3/1995 | Michie | 342/26 B |
| 7,109,913 B1 * | 9/2006 | Paramore et al. | 342/26 B |
| 7,209,070 B2 * | 4/2007 | Gilliland et al. | 342/26 B |
| 7,733,264 B1 * | 6/2010 | Woodell et al. | 342/26 B |
| 8,134,491 B1 * | 3/2012 | Meyer et al. | 342/65 |
| 2009/0024311 A1 * | 1/2009 | Hess | 701/200 |

* cited by examiner

*Primary Examiner* — Phung Nguyen
(74) *Attorney, Agent, or Firm* — Donna P. Suchy; Daniel M. Barbieri (57) ABSTRACT

Present novel and non-trivial system, apparatus, and method for generating a lateral meteorological profile are disclosed. The system is comprised of a source for providing hazard data and a lateral profile generator ("LPG"), where the source could be comprised of an aircraft weather system and/or a datalink system through which hazard weather data is received. The apparatus is comprised of the LPG configured to perform the method comprised of receiving hazard data, determining profile location data, and generating profile image data. The hazard data represents location information of each hazard located outside the aircraft, the profile location data is representative of a plurality of locations of maximum vertical sector height within a vertical sector, and the profile image data is representative of a lateral meteorological profile comprised of a plurality of points, each point corresponding to one location of the maximum vertical sector height.

20 Claims, 10 Drawing Sheets

```
BOSR WS 050600
SIGMET ROMEO 2 VALID UNTIL 051000
ME NH VT
FROM MLT TO YSJ TO CON TO MPV TO MLT
OCNL SEV TURB BLW 080 EXP DUE TO STG NWLY FLOW.  CONDS
CONTG BYD 1000Z.
```

CONVECTIVE SIGMET 55C
VALID UNTIL 1855Z
TX NM
FROM 20NE ABQ-30WNW CIM-60NW AMA-40SE TCC-20NE ABQ
AREA SEV TS MOV FROM 33025KT. TOPS TO FL400.
HAIL TO 2 IN...WIND GUSTS TO 70KT POSS.

AIRMET ICE...WA OR ID MT
FROM YXH TO MLP TO SEA TO PDX TO PDT TO BIL TO YXH
MOD ICE BTN 120 AND FL200. CONDS CONTG BYD 20Z THRU 02Z.

SYSTEM, APPARATUS, AND METHOD FOR GENERATING A LATERAL METEOROLOGICAL PROFILE ON AN AIRCRAFT DISPLAY UNIT

BACKGROUND OF THE INVENTION

1. Field of the Invention

This invention pertains generally to the field of aircraft display units that present flight information to the pilot or flight crew of an aircraft.

2. Description of the Related Art

Avoiding weather threats is an important pilot responsibility. Most modern flight decks display horizontal weather radar information as an overlay to a Head-Down Display ("HDD") unit. Some aircraft provide vertical weather information on a vertical situation display ("VSD"). Oftentimes in assessing a weather situation, a pilot desires to know the vertical height of a storm and whether the aircraft can clear or climb over the weather within a significant margin.

Determining storm tops in an aircraft with only horizontal weather information is very difficult, particularly for embedded cells that are not visible to the pilot. Vertical weather on a VSD may help the pilot with his or her assessment to the flight level but only for the narrow slice shown on the VSD.

BRIEF SUMMARY OF THE INVENTION

The embodiments disclosed herein present at least one novel and non-trivial system, apparatus, and method for generating a lateral meteorological profile that is presented on a display unit. The lateral meteorological profile could enable the pilot to more quickly access the total storm tops situation in front of the aircraft and more efficiently assess a possible deviation maneuver without having to mentally integrate multiple VSD weather slices.

In one embodiment, a system is disclosed for generating a lateral meteorological profile, where such system may be comprised of a source for providing hazard data and a lateral profile generator ("LPG")-configured to receive the hazard data, determine profile location data, and generate profile image data. The source for providing hazard data could be comprised of an aircraft weather system and/or a datalink system through which hazard weather data is received. The disclosed system could also be comprised of a presentation system configured to receive profile image data provided by the LPG and present an image represented therein on a display unit such as a Head-Up Display ("HUD") unit and/or a Head-Down Display ("HDD") unit. The LPG could be a processor of the weather radar system, the datalink system, or a presentation system.

In another embodiment, an apparatus is disclosed for generating a lateral meteorological profile, where such apparatus may be comprised of the LPG configure to receive the hazard data, determine profile location data, and generate profile image data. If a presentation system is used, the LPG may be configured to provide the profile image data to it, whereby an image represented in the profile image data may be presented on the HUD and/or HDD units.

In another embodiment, a method is disclosed for generating a lateral meteorological profile. The disclosed method may be comprised of receiving the hazard data, determining profile location data, and generating profile image data. The hazard data may be representative of location information of each hazard located in the scene in front of the aircraft. If the hazard data is provided from the weather radar system, it may be representative of location information comprised of azimuth, range, and elevation data; if the hazard data is provide through a datalink system, it may be representative of location information comprised of delineated horizontal limits, a designated ceiling altitude, and a designated floor if applicable.

The profile location data may be determined by the LPG as a function of the hazard data. The profile location data may be representative of a plurality of locations of maximum vertical sector height, where each vertical sector height may correspond to one hazard height located in one vertical sector. Each maximum vertical sector height may be determined as a function of a maximum hazard elevation angle of the vertical sector. After the profile location data has been determined, the LPG may generate the profile image data as a function of it. The profile image data may be representative of the lateral meteorological profile comprised of a plurality of points, where each point may correspond to one location of maximum vertical sector height.

BRIEF DESCRIPTION OF THE DRAWINGS

The drawings of FIG. 2 provide exemplary depictions of display units.

The drawings of FIG. 3 depict the view of the sky outside of the aircraft as seen through a HUD unit.

The drawings of FIG. 4 illustrate a meteorological profile that is presented on the surface of the HUD unit.

The drawings of FIG. 5 illustrate vertical sectors which originate from an aircraft.

The drawings of FIG. 6 provide an exemplary non-convective SIGMET.

The drawings of FIG. 7 provide an exemplary convective SIGMET.

The drawings of FIG. 8 provide an exemplary AIRMET.

DETAILED DESCRIPTION OF THE INVENTION

In the following description, several specific details are presented to provide a thorough understanding; of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
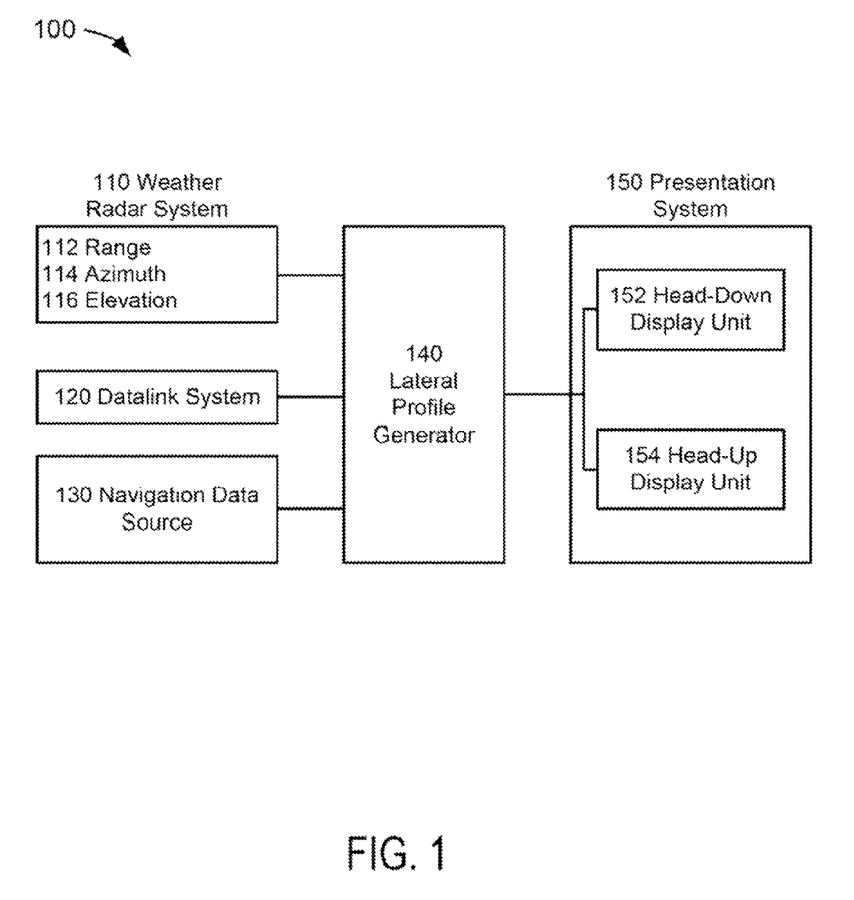
FIG. 1 depicts a block diagram of a meteorological profile generating system.

FIG. 1 depicts a block diagram of a meteorological profile generating system 100 suitable for implementation of the techniques described herein. The system 100 of an embodiment of FIG. 1 includes a weather radar system 110, a datalink system 120, a navigation data source 130, a lateral profile generator ("LPG") 140, and a presentation system 150.

The weather radar system 110 is well-known to those skilled in the art. The weather radar system 110 may be comprised of, in part, a transceiver and antenna. A transceiver may transmit microwaves within a sweep zone into the atmosphere via an antenna which, in turn, produces a focused beam. The transceiver may control the direction of the beam by steering the antenna horizontally (i.e., laterally) and vertically. When the signal strikes or reflects off an object such as meteorological conditions, part of the microwave energy is reflected back and received by the antenna. The range 112 of the object may be determined by the transceiver by measuring the elapsed time between the transmission and reception of the signal. The azimuth 114 of the object may be determined as the angle to which the antenna was steered in the horizontal direction relative to the longitudinal axis of the aircraft during the transmission/reception of the signal. The elevation or elevation angle 116 of the object may be determined as the angle to which the antenna was steered in the vertical direction relative to the longitudinal axis of the aircraft during the transmission/reception of the signal. As embodied herein, the weather radar system 110 could acquire hazard data including, but not limited to, the range 112, the azimuth 114, and the elevation angle 116 of the hazard, and based upon the acquired signals, could determine the location of one or more hazards represented in the hazard data.

One example of the weather radar system 110 is the WXR-2100 MultiScan Hazard Detection Weather Radar System ("Hazard Detection System") that has been developed by Rockwell Collins. The Hazard Detection System is an example of newer technologies which have departed from the traditional or classic weather radar systems. The Hazard Detection System could employ an automatic weather sensor operative to 320 nautical miles that displays not only classic precipitation rates but also significant weather hazards without pilot manipulation of tilt or gain settings typical of classic weather radar systems. The Hazard Detection System has many key features including, but not limited to, forward-looking windshear detection with turbulence alerts, geographic weather conditions, true zero automatic antenna misalignment compensation, overflight and predictive overflight protection, enhanced turbulence detection, flight phase hazard analysis, and storm top information. The Hazard Detection System could also include vertical display of range and height indicator, enhanced ground clutter suppression, and path attenuation compensation. As embodied herein, hazard data acquired by the weather radar system 110 could include one or more of the preceding hazards, where the inclusion of such data could be configurable to a manufacturer or end-user. This hazard data could be provided to the LPG 140 for subsequent processing as discussed below.

The datalink system 120 includes those systems that receive weather or hazard data from sources external to the aircraft including, but not limited to, ground stations and satellites. Weather data transmitted through the datalink system 120 could originate from or be provided by a plurality of weather data sources including, but not limited to, XM Satellite Radio, Inc. and Universal Weather and Aviation, Inc. Data representative of weather conditions may be continuously broadcast via a satellite datalink system. Weather data could include data found in a variety of weather products such as, but not limited to, Significant Meteorological Information ("SIGMET"), Airmen's Meteorological Information ("AIRMET"), Aviation Routine Weather Report ("METAR"), Next-Generation Radar ("NEXRAD"), surface analysis weather maps, surface pressure, surface wind speed and direction, winds aloft, wind shear detection, echo tops, and freezing levels.

Weather products contain meteorological data which could convey aviation hazards which, in turn, could affect the safe operations of an aircraft in flight. As embodied herein, SIGMETs are weather products that could provide notice to a pilot of an aircraft of potentially hazardous en route phenomena such as, but not limited to, thunderstorms and hail, turbulence, icing, sand and dust storms, tropical cyclones, and volcanic ash. In the United States, there are two types of SIGMETs: non-convective and convective. Examples of each are provided below.

Another weather product containing meteorological data which could convey aviation hazards is an AIRMET. As embodied herein, AIRMETs are weather products that could provide a concise description of the occurrence or expected occurrence in time and space of specified en route weather phenomena. Although intensities may be lower than those of SIGMETS, the weather phenomena could still affect the safety of aircraft operations such as, but not limited to, icing, turbulence, strong surface winds and low-level wind shear, instrument meteorological conditions requiring pilots to fly primarily on instruments (e.g., low ceiling or visibility), and mountain obscuration. An example of an AIRMET is provided below. In an embodiment of FIG. 1, hazard data representative of weather information could be transmitted to the datalink system 120 which could provide hazard data to the LPG 140 for subsequent processing as discussed herein.

The navigation data source 130 comprises the system or systems that could provide navigation information or data in an aircraft. As embodied herein, aircraft could mean any vehicle which is able to fly through the air or atmosphere including, but not limited to, lighter than air vehicles and heavier than air vehicles, wherein the latter may include fixed-wing and rotary-wing vehicles. The navigation data source 130 may include, but is not limited to, an air/data system, an attitude heading reference system, an inertial guidance system (or inertial reference system), a global navigation satellite system (or satellite navigation system), and a flight management computing system, all of which are known to those skilled in the art. The navigation data source 130 could provide navigation data including, but not limited to, geographic location, altitude, heading, speed, and vertical speed. As embodied herein, aircraft position data provided by a satellite navigation system may comprise of geographic position (e.g., latitude and longitude coordinates) and altitude. Heading, speed, and vertical speed may be derived using data representative of either geographic position, aircraft position, or a combination thereof. As embodied herein, the navigation data source 130 could provide navigation data to the LPG 140 for subsequent processing as discussed herein.

The LPG 140 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The LPG 140 may be driven by the execution of software or computer instruction code containing algorithms developed for the specific functions embodied herein; alternatively, the LPG 140 may be implemented as an application-specific integrated circuit (ASIC). Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing unit. As embodied herein, the LPG 140 could be a processor(s) used by or in conjunction with any other system of the aircraft including, but not limited to, a processor(s) of the weather radar 110, the datalink system 120, the navigation data source 130, the presentation system 150, a synthetic vision system ("SVS"), an enhanced vision system ("EVS"), a combined SVS-EVS, or any combination thereof.

The LPG 140 may receive input data from various systems including, but not limited to, the weather radar system 110, the datalink system 120, and the navigation data source 130. The LPG 140 may be operatively coupled or electronically coupled to one or more of these facilitate the receipt of the input data; as embodied herein, operatively coupled may be considered as interchangeable with electronically coupled. In addition, the LPG 140 may provide output data to various systems including, but not limited to, the presentation system 150. The LPG 140 may be electronically coupled to this system to facilitate the providing of the output data. It is not necessary that a direct connection be made; instead, such receipt of input data and the providing of output data could be provided through, but not limited to, a data bus or through a wireless network.

In an embodiment of FIG. 1, the presentation system 150 could comprise of one or more display units that may provide tactical flight information. As embodied herein, tactical flight information could be information relevant to the instant or immediate control of the aircraft, whether the aircraft is in flight or on the ground. Display units may include, but are not limited to, Head-Down Display ("HDD") unit 152 and Head-Up Display ("HUD") 154 unit. The HDD unit 152 is typically a unit mounted to an aircraft's flight instrument panel located in front of a pilot and below the windshield and the pilot's field of view. The HDD unit 152 could display the same information found on a primary flight display ("PFD"), such as "basic T" information (i.e., airspeed, attitude, altitude, and heading). Although it provides the same information as that of a PFD, the HDD unit 152 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications.

The HUD unit 154 provides tactical information to the pilot or flight crew, in the pilot's forward field of view through the windshield, eliminating transitions between head-down and head-up flying. Similar to the HDD unit 152, the HUD unit 154 may be tailored to the desired configuration specified by a buyer or user of the aircraft. Both the HDD unit 152 and the HUD unit 154 are designed to provide flexible configurations which may be tailored to the desired configuration specified by a buyer or user of the aircraft.

Figure 2A:
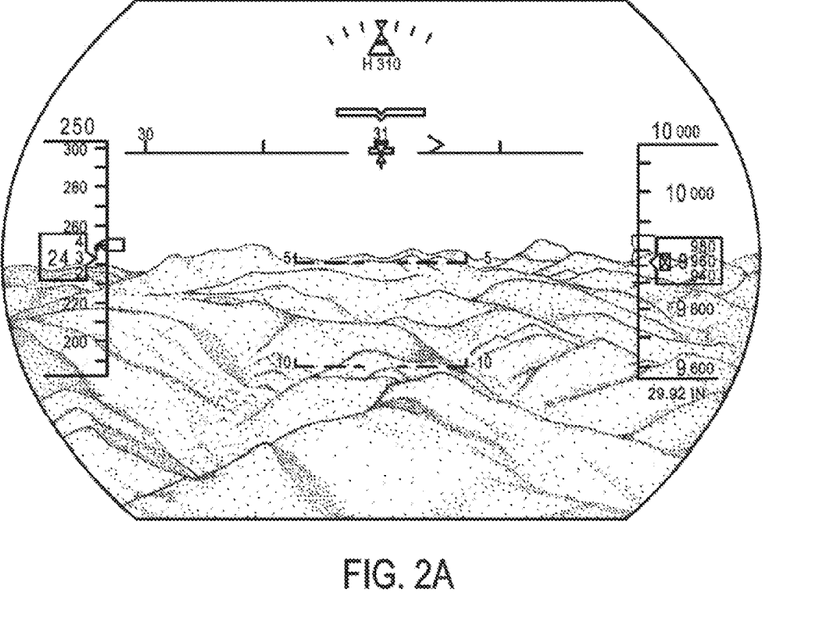
Figure 2B:
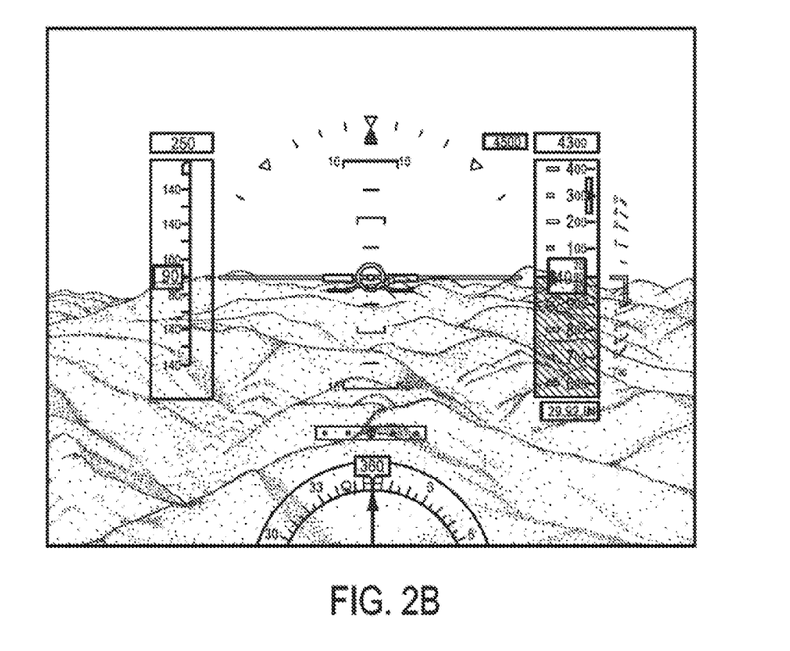

The drawings of FIG. 2 provide exemplary depictions of display units. FIG. 2A provides an exemplary depiction of a HUD unit, and FIG. 2B provides an exemplary depiction of an HDD unit. Both provide tactical information to the pilot or flight crew against the background of a three-dimensional image of terrain and sky. The HUD unit and/or the HDD unit could be employed as a display unit in the SVS, the EVS, or the combined SVS-EVS. It should be noted that the tactical information depicted on these display units has been made minimal for the sake of presentation and is not indicative of the plurality of indications or information with which it may be configured.

Figure 3A:
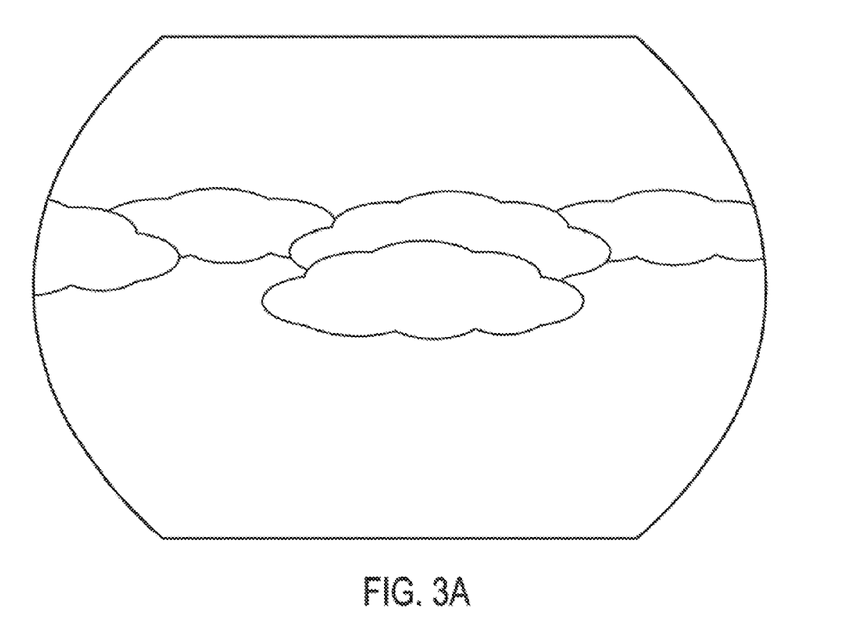
Figure 3B:
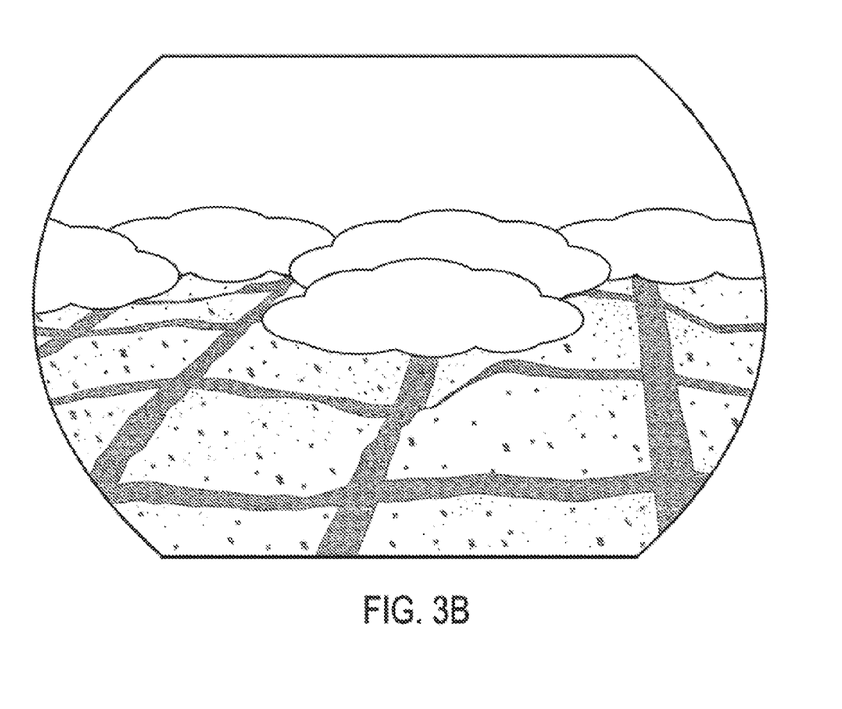

The drawings of FIG. 3 depict the view of the sky outside of the aircraft as seen through a HUD unit. FIG. 3A depicts cumulonimbus clouds indicative of embedded thunderstorms that located in the scene in front of aircraft that are observable by the pilot through the HUD unit. For the purpose of discussion, the clouds coincide with a weather hazard, where data representative of the hazard has been provided to the LPG 140 from the weather radar system 110. In FIG. 3B, a synthetic image representative of the terrain located in the scene has been added to the HUD unit of FIG. 3A. The terrain is represented by a terrain-fitted, two-dimensional fishnet pattern with randomly-distributed specks as disclosed by VanDerKamp et al in U.S. patent application Ser. No. 12/080,121.

The advantages and benefits of the embodiments discussed herein may be illustrated by disclosing a meteorological profile that may be presented on a display unit of the presentation system 150 and the generation of reference data from which the profile is generated. The profile may depict the "tops" of weather phenomena located in the scene in front of the aircraft.

The drawings of FIG. 4 illustrate a meteorological profile that is presented on the surface of a display unit. The profile traverses a display unit laterally and is indicative of the top of the weather hazards shown in the drawings of FIG. 3. In FIG. 4A, the meteorological profile is presented on the HUD unit through which the hazard located in the scene in front of aircraft is actually seen by the pilot. As seen, the meteorological profile is located at the top of the weather hazards. In FIG. 4B, the meteorological profile is presented with a synthetic image of terrain that has been added to the HUD unit of FIG. 4A. In FIG. 4C, the weather hazards located in front of the aircraft have been removed, leaving the presentation of the meteorological profile and the synthetic image of terrain on the HUD unit.

Figure 4A:
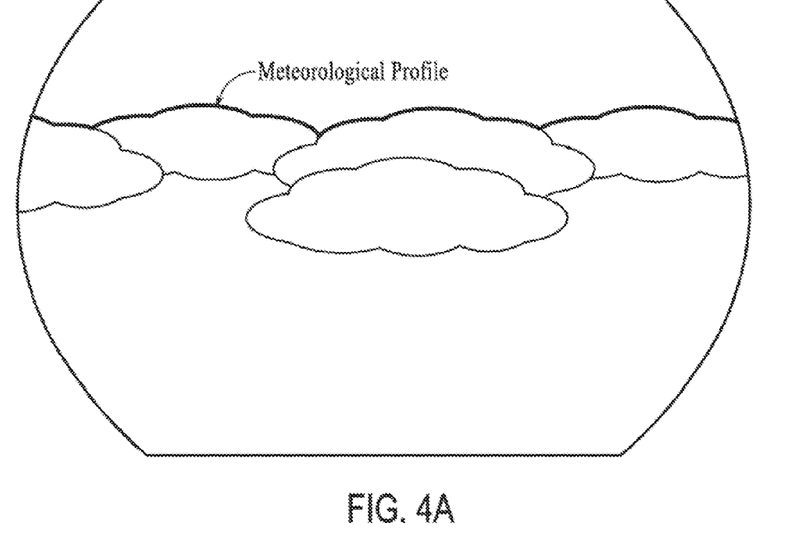
Figure 4B:
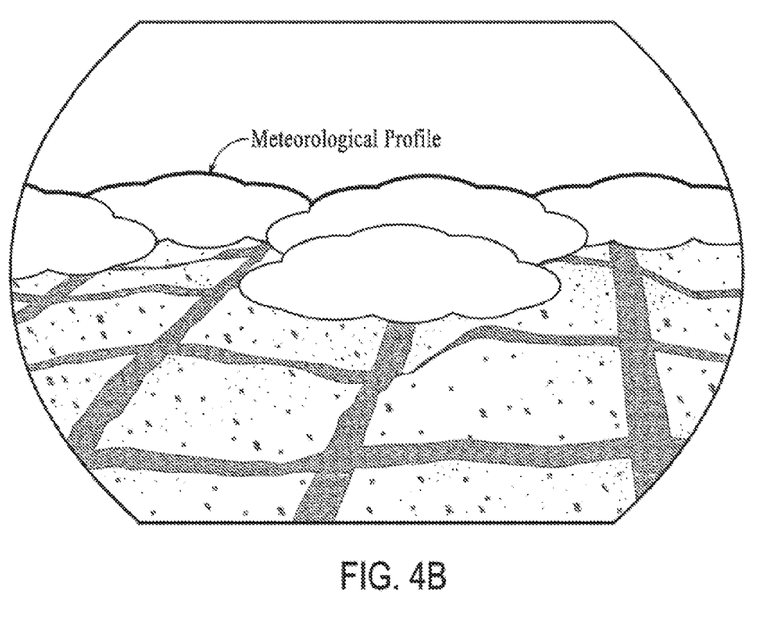
Figure 4C:
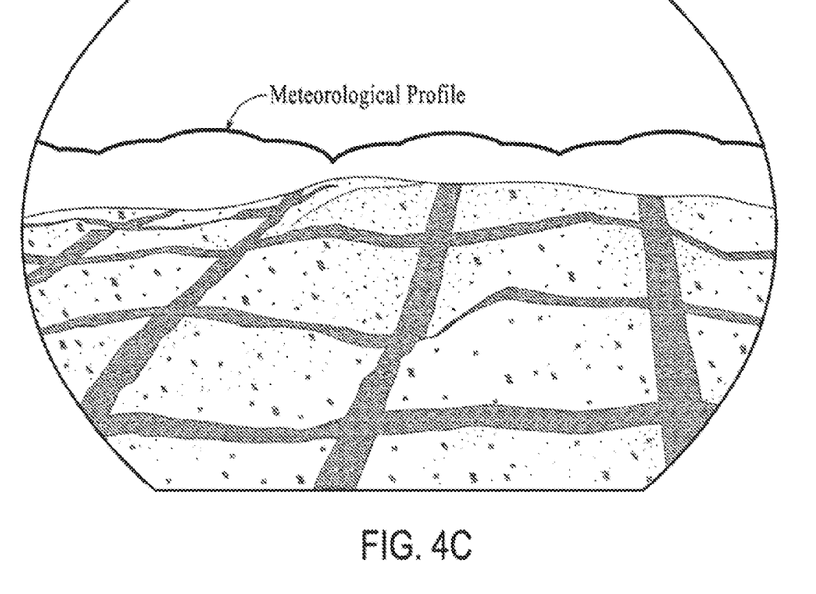
Figure 4D:
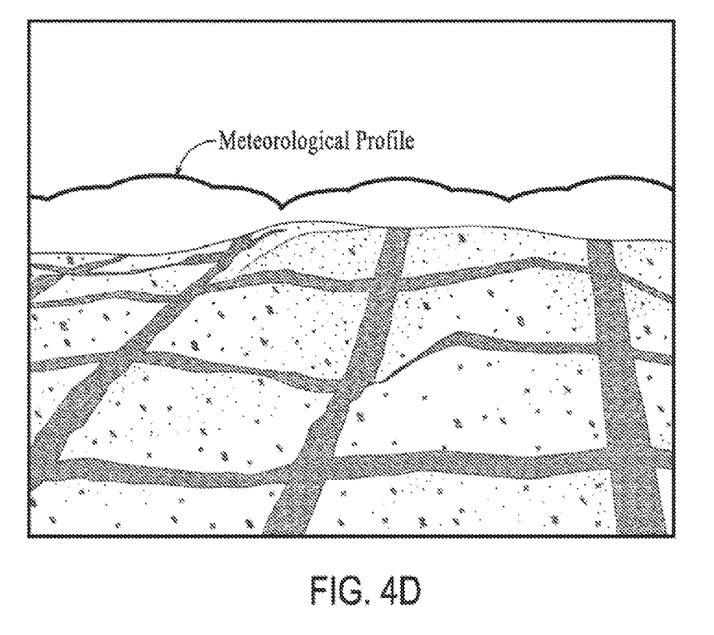

Besides the HUD unit, the meteorological profile may also be presented on other display units. As shown in FIG. 4D, the meteorological profile and the synthetic image of terrain is presented on an HDD unit.

Figure 5A:
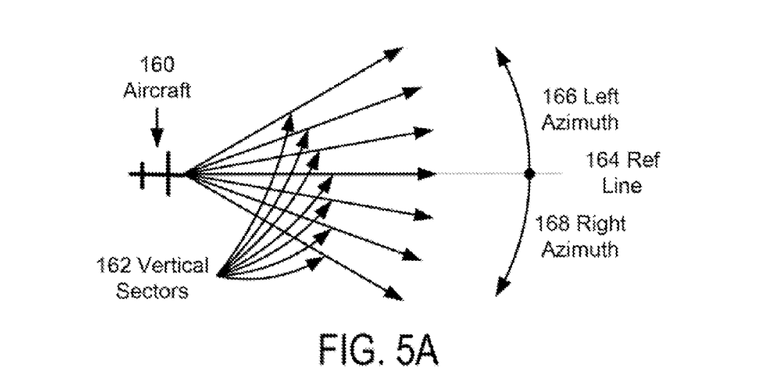

The meteorological profile may be indicative of the maximum height of one or more hazards located in the scene in front of the aircraft, but whether or not the maximum height of each hazard is indicated in the profile may depend upon whether the two or more hazards fall within the same vertical sector. The drawings of FIG. 5 illustrate vertical sectors which originate from an aircraft 160. FIG. 5A illustrates a plan view above the aircraft 160 from which a plurality of vertical sectors 162 originate. Each vertical sector is measured from a reference line 164 by a left azimuth 166 or right azimuth 168 (or zero azimuth for the vertical sector coinciding with the reference line 164). The reference line could correspond to the heading and/or ground track of the aircraft but is not limited to these two references. Although the sectors are shown as lines indicative of a thin plane, the sectors could be three-dimensional and have a variable width.

Figure 5B:
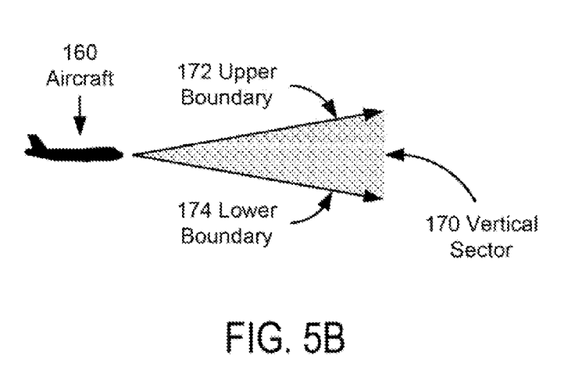

FIG. 5B illustrates a side view of a typical vertical sector 170 that is bounded by an upper boundary 172 and a lower boundary 174. The upper boundary 172 and the lower boundary 174 could correspond to the vertical field of view to which the HDD unit 152 and/or the HUD unit 154 are configured to display.

Figure 5C:
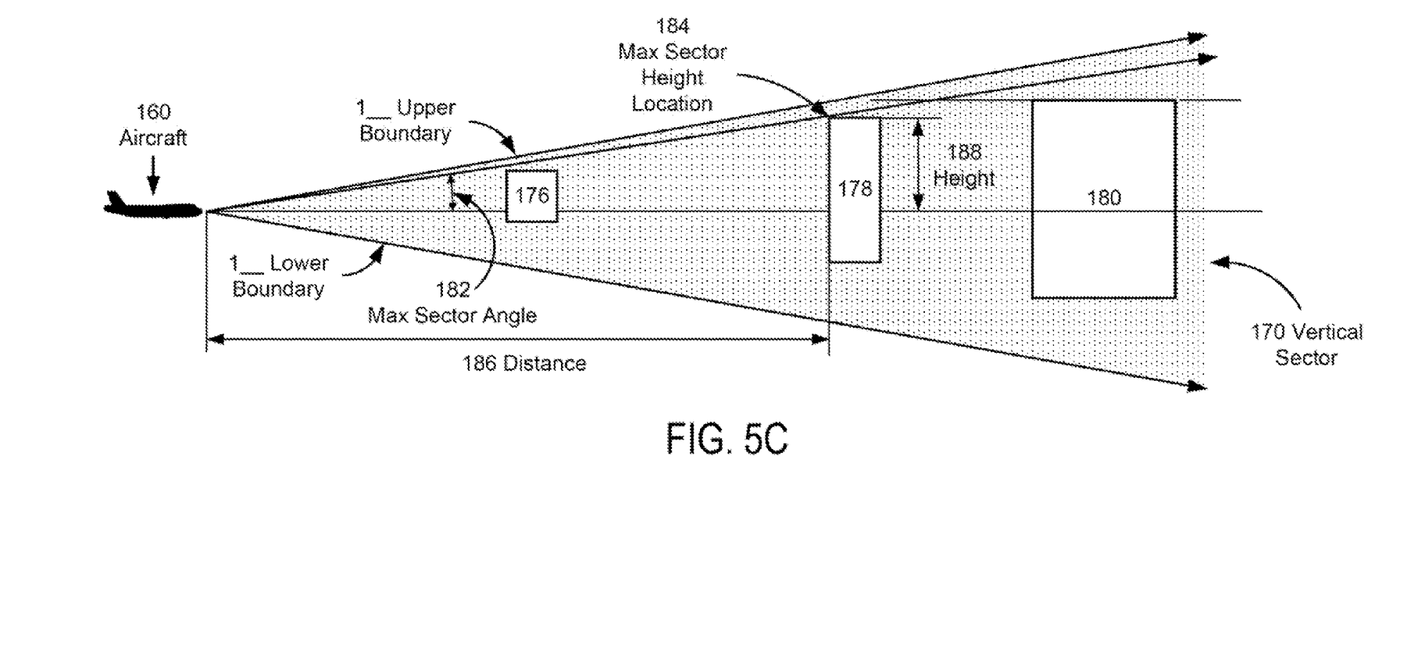

FIG. 5C illustrates the vertical sector 170 slicing through three hazards 176, 178, and 180; that is, the three hazards are located within the vertical sector 170. The location of a maximum hazard height of the vertical sector 170 may be used to generate a lateral meteorological profile. If there is only one hazard located within the vertical section, then the maximum sector hazard height may be the height of the hazard. For example, if hazards 176 and 180 are not located with the vertical sector 170, the maximum sector hazard height could be the height 188 of the hazard 178. If there are two or more hazards, then a maximum sector angle 182 may be determined to find which hazard is the highest in the pilot's view. As shown in FIG. 5C, the hazard 178 produces the maximum sector angle 182 even though the hazard 176 is closer to the aircraft 160 and the hazard 180 is higher than the hazard 178. After the maximum sector angle 182 has been determined, the location of the maximum sector height 184 may be determined and used to generate the meteorological profile along with the other maximum sector height locations. The location could be determined as a function of the distance 186 and the height 188. If the weather radar system 110 is the source of hazard data, the distance 186 and height 188 to the hazard 178 may correlate with the range 112 and the elevation angle 116 for the vertical sector located at the azimuth 114.

Figure 6A:
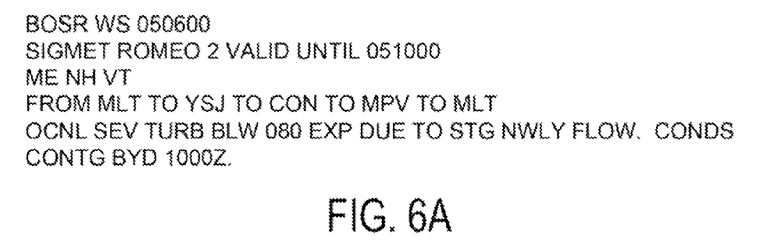
Figure 6B:
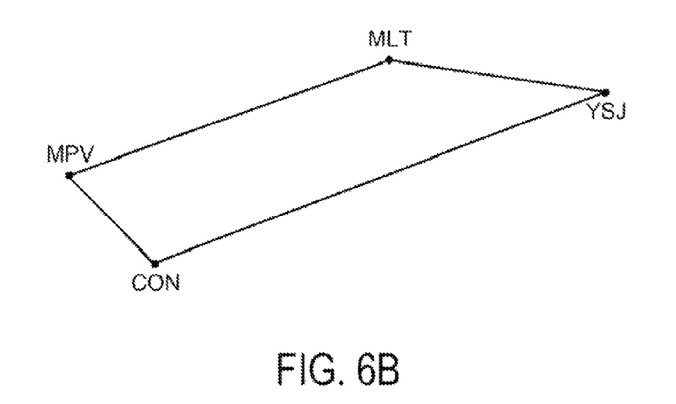
Figure 6C:
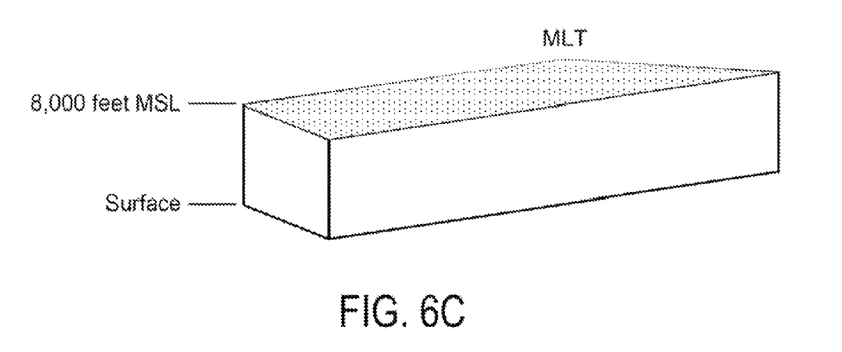
Figure 7A:
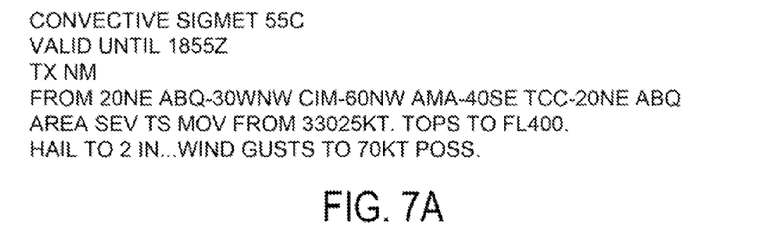
Figure 7B:
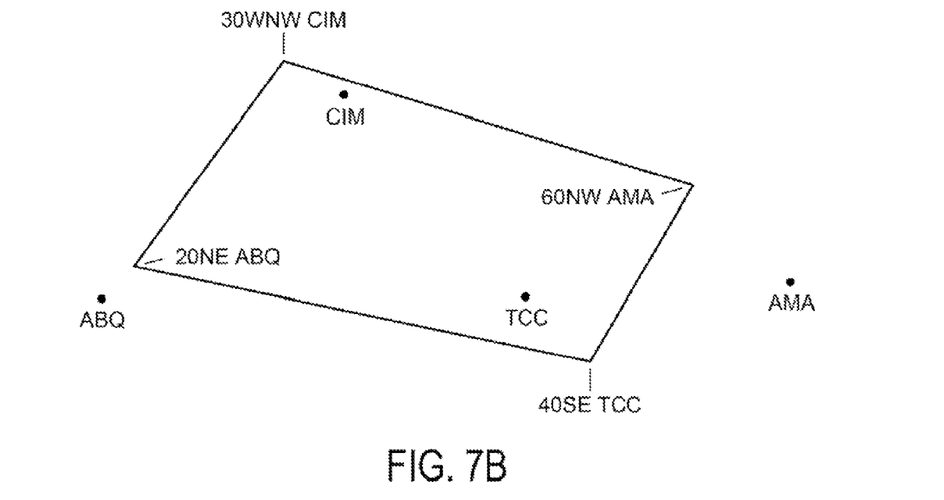
Figure 7C:
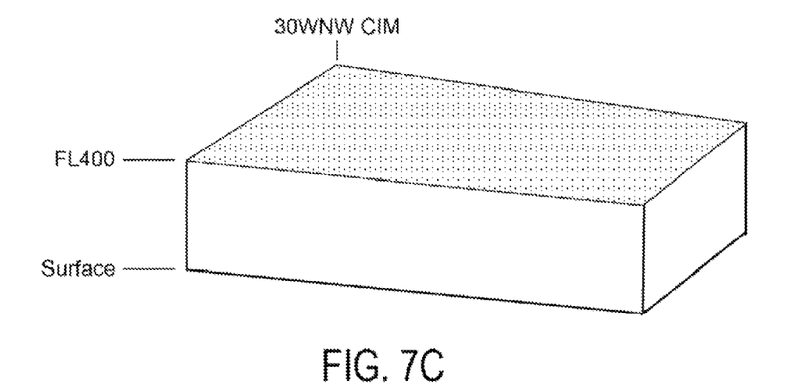
Figure 8A:
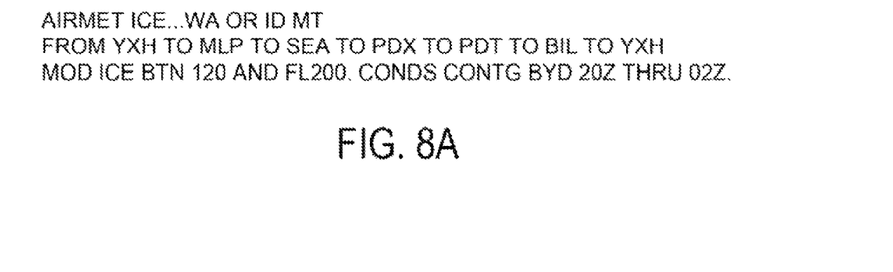
Figure 8B:
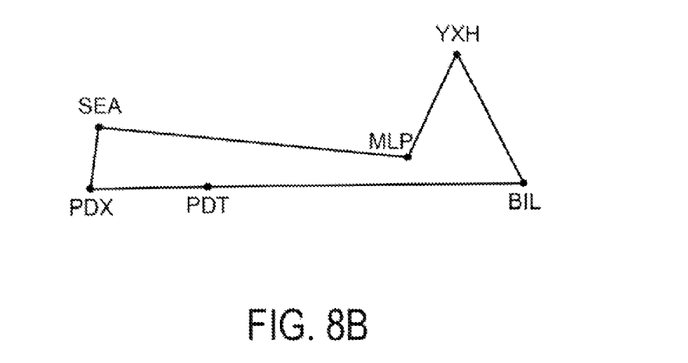
Figure 8C:
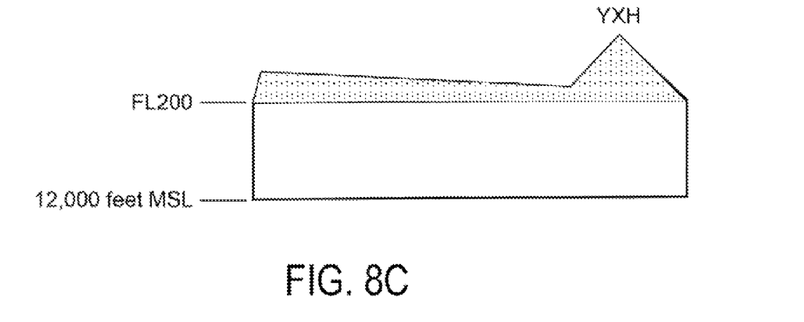

If the hazard data is provide through datalink system 120, the location of the maximum sector height 184 could be determined from the location information provided in hazard data. The drawings of FIG. 6 through 8 provide three examples of hazard data that could be received through the datalink system 120. These examples were disclosed by Frank et al in U.S. patent application Ser. No. 12/217,457 entitled "System and Method for Generating Alert Signals in a Weather Awareness and Warning System," which is incorporated herein in its entirety. Each example may provide, in part, the vertical or perimeter surface(s), floors, and ceilings of weather areas that delineate horizontal limits and designate altitudes of defined weather areas. For the purpose of illustration only, the surface of the Earth is shown as flat.

The defined weather area of a non-convective SIGMET may be considered a hazard for the purpose of generating a meteorological profile. FIG. 6A provides an exemplary non-convective SIGMET which provides, in part, a delineation of horizontal limits and designation of a ceiling altitude that define a weather area. The SIGMET reads as follows: "SIGMET issued for the Boston Area Forecast region on the 5th day of the month at 0600 UTC. This is the second (2nd) issuance of SIGMET series Romeo and is valid until the 5th day of the month at 1000 UTC. The affected states are Maine, New Hampshire, and Vermont. Within an area bounded from Millinocket, Maine (MLT); to St. John, New Brunswick (YSJ); to Concord, New Hampshire (CON); to Montpelier, Vermont (MPV); to Millinocket, Maine. Occasional severe turbulence below 8,000 feet mean sea level ("MSL") due to strong northwesterly flow. Conditions are expected to continue beyond 1000 UTC." FIG. 6B illustrates a two-dimensional depiction of the horizontal delineations described in the SIGMET. FIG. 6C illustrates a three-dimensional depiction where the vertical faces of the weather area represent perimeter surfaces of the area, and the horizontal face (shown as the shaded surface) represents the ceiling. Although the "floor" of the weather area is not depicted, it is represented by the surface of the Earth bounded by the horizontal delineations.

The defined weather area of a convective SIGMET may be considered a hazard for the purpose of generating a meteorological profile. FIG. 7A provides an exemplary convective SIGMET which provides, in part, a delineation of horizontal limits and designation of a ceiling altitude that define a weather area. The SIGMET reads as follows; "Convective SIGMET 55C is the 55th convective SIGMET issued for the central region of the US on the 25th day of the month. Valid until 1855 UTC. States affected include Texas and New Mexico. Bounded with an area from 20 miles northeast of Albuquerque (ABQ); to 30 miles west-northwest of Cimarron, New Mexico (CIM); to 60 miles northwest of Amarillo, Texas (AMA); to 40 miles southeast of Tucumcari, New Mexico (TCC); to, 20 miles northeast of Albuquerque. An area of severe thunderstorms is moving from 330 degrees (to the southeast) at 25 knots. Thunderstorms tops to Flight Level 400 (approximately 40,000 feet MSL). Hail up to 2 inches in diameter and wind gusts to 70 knots are possible." FIG. 7B illustrates a two-dimensional depiction of the horizontal delineations described in the convective SIGMET, and FIG. 7C illustrates a three-dimensional depiction in a similar fashion as shown in FIG. 7C.

The defined weather area of an AIRMET may be considered a hazard for the purpose of generating a meteorological profile: FIG. 8A provides an exemplary AIRMET which provides, in part, a delineation of horizontal limits and designation of ceiling and floor altitudes that define a weather area. The AIRMET reads as follows: "AIRMET for icing for Washington, Oregon, Idaho, and Montana. Bounded within an area from Medicine Hat, Alberta (YXH); to Mullan Pass, Idaho (MLP); to Seattle, Wash. (SEA); to Portland, Oreg. (PDX); to Pendleton, Oregon (PDT); to Billings, Montana (BIL); to Medicine Hat, Alberta. Moderate icing between 12,000 feet MSL and Flight Level 200 (approximately 20,000 feet MSL). Conditions continuing beyond 2000 UTC through 0200 UTC." FIG. 8B illustrates a two-dimensional depiction of the horizontal delineations described in the AIRMET. FIG. 9C illustrates a three-dimensional depiction where the vertical faces of the weather area represent perimeter surfaces of the area, and the horizontal face (shown as the shaded surface) represents the ceiling. Although the "floor" of the weather area is not depicted in FIG. 8C, the floor is located at 12,000 feet MSL.

Figure 9:
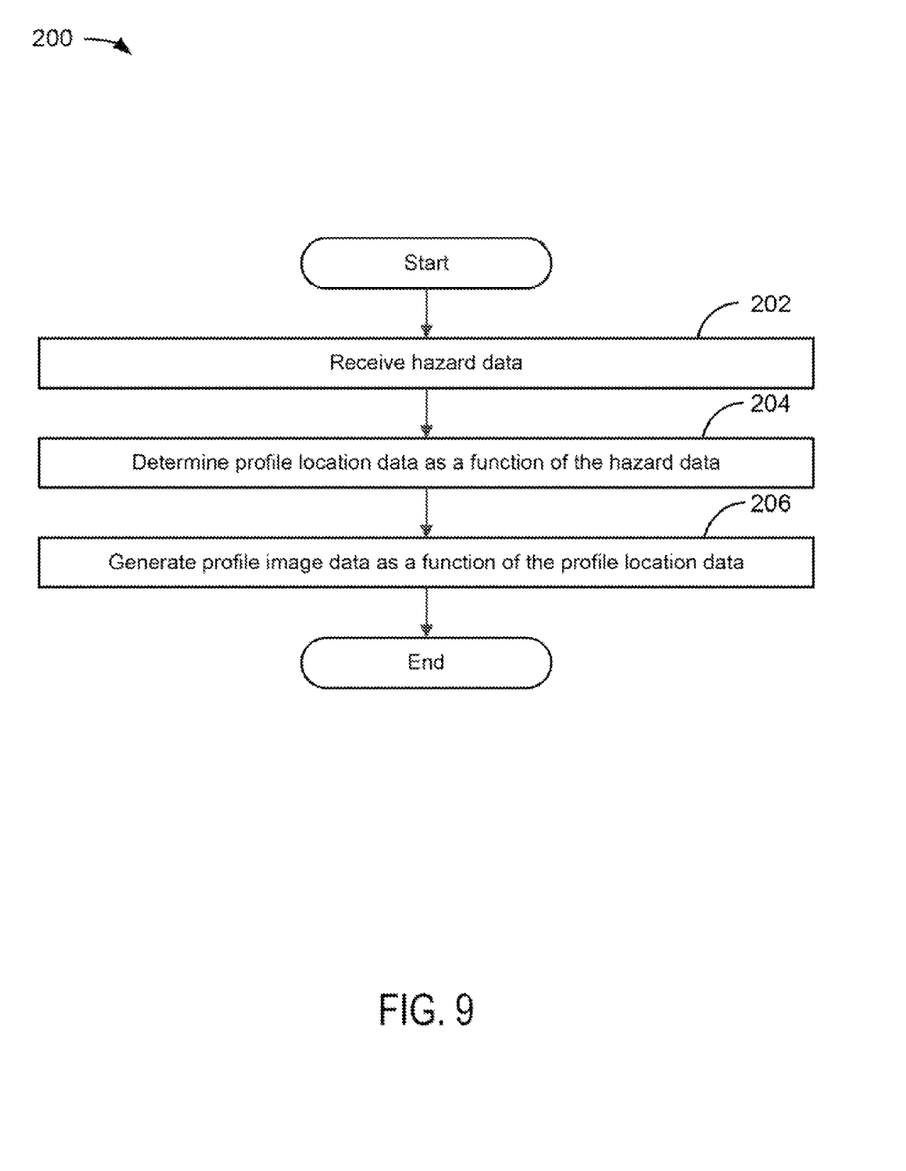
FIG. 9 depicts a flowchart of a method for generating a lateral meteorological profile.

FIG. 9 depicts, flowchart 200 that provides an example of how a lateral meteorological profile is generated, where the LPG 140 may be programmed or configured with instructions corresponding to the following modules. As embodied herein, the LPG 1140 may be a processor of a module such as, but not limited to, a printed circuit card having one or more input interfaces to facilitate data communications with the LPG 140, i.e., the receiving and providing of data. As necessary for the accomplishment of the following modules embodied in FIG. 9, the receiving of data is synonymous and/or interchangeable with the retrieval of data, and the providing of data is synonymous and/or interchangeable with the making available or supplying of data.

The method of flowchart 200 begins with module 202 with the receiving of hazard data. This hazard data may be representative of location information of each hazard located in the scene in front of the aircraft. If the hazard data is received from the weather radar system 110, then the location information represented in the hazard data may be comprised of the range 112, the azimuth 114, and the elevation angle 116. If the hazard data is received through the datalink system 120, then the location information may be comprised of delineated horizontal limits, a ceiling altitude, and a designated floor if applicable. Because these may be referenced to latitude/longitude coordinates or identifiable locations corresponding to latitude/longitude coordinates, the receiving of navigation data representative of ownship position may be used to provide a common frame of reference from which the profile location data may be determined.

The method continues with module 204 with the determining of profile location data as a function of the hazard data. The profile location data may be comprised of a plurality of locations of maximum vertical sector height. As discussed above, each maximum vertical sector height could correspond to one hazard height located within a vertical sector. If more than one hazard is located within the vertical sector, then the hazard which produces the maximum sector angle may be used to determine the location of the maximum height for that vertical sector. If the hazard data is received from the weather radar system 110, then the profile location data may be determined as a function of the range 112, the azimuth 114, and the elevation angle 116. If the hazard data is received through the datalink system 120, then the profile location data may be determined as a function of the delineated horizontal limits, the ceiling altitude, and the designated floor if applicable.

The method continues with module 206 with the generating of profile image data as a function of the profile location data. The profile image data may be representative of a lateral meteorological profile comprised of a plurality of points. Each point could correspond to one location of the maximum vertical sector height. As embodied herein, the lateral meteorological profile may be conformal to the scene in front of the aircraft.

Additionally, the method could continue with the providing of the profile image data to the presentation system 150, where the presentation system 150 could be configured to receive the profile image data and present the image represented therein to the surface of a display unit such as the HDD unit 152 and/or the HUD unit 154. As such, the pilot may be provided with a visual cue of the "tops" of the hazards that are located in the scene in front of the aircraft. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating a lateral meteorological profile on an aircraft display unit, such system comprising:
   at least one source for providing hazard data; and
   a lateral profile generator configured to
      receive hazard data representative of location information of each hazard located in the scene in front of the aircraft,
      determine profile location data as a function of the hazard data, where
         the profile location data is representative of a plurality of locations of maximum vertical sector height, where
            each maximum vertical sector height corresponds to one hazard height located within a vertical sector, and
      generate profile image data as a function of the profile location data, where
         the profile image data is representative of a lateral meteorological profile comprised of a plurality of points, where
            each point corresponds to one location of maximum vertical sector height.

2. The system of claim 1, wherein each maximum vertical sector height is determined as a function of a maximum hazard elevation angle of the vertical sector.

3. The system of claim 1, wherein
   the source for providing hazard data is comprised of a weather radar system,
   the hazard data is received from the weather radar system,
   the location information represented in the hazard data is comprised of azimuth, range, and elevation angle information acquired by the weather radar system, and
   the profile location data is determined as a function of azimuth, range, and elevation angle of the hazard data.

4. The system of claim 1, further comprising:
   a source of navigation data, where
      the hazard data is received via a datalink system, where
         the location information represented in the hazard data is comprised of delineated horizontal limits and a designated ceiling altitude, and
      the lateral profile generator has been further configured to
         receive navigation data representative of aircraft position, such that
            the profile location data is determined as a function of the navigation data and the delineated horizontal limits and the designated ceiling altitude of the hazard data.

5. The system of claim 1, wherein the lateral meteorological profile is conformal to the scene outside the aircraft.

6. The system of claim 1, wherein the lateral profile generator is a processor of a weather radar system, a datalink system, or a presentation system.

7. The system of claim 1, further comprising:
   a presentation system configured to
      receive the profile image data, where
         the lateral profile generator has been further configured to provide the profile image data to the presentation system, and
      present the image represented in the profile image data on the surface of at least one display unit of the presentation system.

8. An apparatus for generating a lateral meteorological profile on an aircraft display unit, such apparatus comprising:
   a lateral profile generator configured to
      receive hazard data representative of location information of each hazard located in the scene in front of the aircraft from at least one source of hazard data,
      determine profile location data as a function of the hazard data, where
         the profile location data is representative of a plurality of locations of maximum vertical sector height, where
            each maximum vertical sector height corresponds to one hazard height located within a vertical sector,
      generate profile image data as a function of the profile location data, where
         the profile image data is representative of a lateral meteorological profile comprised of a plurality of points, where
            each point corresponds to one location of maximum vertical sector height.

9. The apparatus of claim 8, wherein each maximum vertical sector height is determined as a function of a maximum hazard elevation angle of the vertical sector.

10. The apparatus of claim 8, wherein
   the hazard data is received from a weather radar system,
   the location information represented in the hazard data is comprised of azimuth, range, and elevation angle information acquired by the weather radar system, and the profile location data is determined as a function of azimuth, range, and elevation angle of the hazard data.

11. The apparatus of claim 8, wherein
the hazard data is received via a datalink system, where
the location information represented in the hazard data is comprised of delineated horizontal limits and a designated ceiling altitude, and
the lateral profile generator has been further configured to receive navigation data representative of aircraft position, such that
the profile location data is determined as a function of the navigation data and the delineated horizontal limits and the designated ceiling altitude of the hazard data.

12. The apparatus of claim 8, wherein the lateral meteorological profile is conformal to the scene outside the aircraft.

13. The apparatus of claim 8, wherein the lateral profile generator is a processor of a weather radar system, a datalink system, or a presentation system.

14. The apparatus of claim 8, wherein
the lateral profile generator has been further configured to a presentation system configured to
provide the profile image data to the presentation system, whereby
the image represented in the profile image data is presented on the surface of at least one display unit of the presentation system.

15. A method for generating a lateral meteorological profile on an aircraft display unit, such method comprising:
receiving hazard data representative of location information of each hazard located in the scene in front of the aircraft from at least one source of hazard data;
determining profile location data as a function of the hazard data, where
the profile location data is representative of a plurality of locations of maximum vertical sector height, where
each maximum vertical sector height corresponds to one hazard height located within a vertical sector; and
generating profile image data as a function of the profile location data, where
the profile image data is representative of a lateral meteorological profile comprised of a plurality of points, where
each point corresponds to one location of maximum vertical sector height.

16. The method of claim 15, wherein each maximum vertical sector height is determined as a function of a maximum hazard elevation angle of the vertical sector.

17. The method of claim 15, wherein
the hazard data is received from a weather radar system,
the location information represented in the hazard data is comprised of azimuth, range, and elevation angle information acquired by the weather radar system, and
the profile location data is determined as a function of azimuth, range, and elevation angle of the hazard data.

18. The method of claim 15, further comprising:
receiving representative of aircraft position from a source of navigation data, such that
the profile location data is determined as a function of the navigation data and delineated horizontal limits and a designated ceiling altitude represented in the hazard data, where
the hazard data has been received via a datalink system.

19. The method of claim 15, wherein the lateral meteorological profile is conformal to the scene outside the aircraft.

20. The method of claim 15, further comprising:
providing the profile image data to a presentation system, whereby
the image represented in the profile image data is presented on the surface of at least one display unit of the presentation system.

\* \* \* \* \*